US011286353B2

(12) United States Patent
Kulkarni et al.

(10) Patent No.: US 11,286,353 B2
(45) Date of Patent: Mar. 29, 2022

(54) MODIFIED POLYESTER MASTERBATCH FOR TEXTILE APPLICATIONS AND MANUFACTURING PROCESS THEREOF

(71) Applicant: Ester Industries Ltd., Haryana (IN)

(72) Inventors: Sanjay Tammaji Kulkarni, Haryana (IN); Balasundaram Dillyraj, Uttarakhand (IN); Chandrakant Omkar Vyas, Uttarakhand (IN); Ram Gopal Parasrampuria, Uttarakhand (IN); Ravindra Tryambak Wani, Uttarakhand (IN)

(73) Assignee: Ester Industries Ltd.

( * ) Notice: Subject to any disclaimer, the term of this patent is extended or adjusted under 35 U.S.C. 154(b) by 137 days.

(21) Appl. No.: 16/331,423

(22) PCT Filed: Dec. 14, 2016

(86) PCT No.: PCT/IN2016/050442
§ 371 (c)(1),
(2) Date: Mar. 7, 2019

(87) PCT Pub. No.: WO2018/047192
PCT Pub. Date: Mar. 15, 2018

(65) Prior Publication Data
US 2019/0256669 A1 Aug. 22, 2019

(30) Foreign Application Priority Data

Sep. 9, 2016 (IN) .............................. 201611030858

(51) Int. Cl.
*C08J 3/22* (2006.01)
*C08G 81/02* (2006.01)
*C08K 5/09* (2006.01)
*C08L 67/02* (2006.01)
*D01F 1/02* (2006.01)
*D01F 6/62* (2006.01)
*D06P 3/52* (2006.01)
*C08G 63/672* (2006.01)
*C08G 63/688* (2006.01)
*C08G 63/78* (2006.01)

(52) U.S. Cl.
CPC ............ *C08J 3/226* (2013.01); *C08G 63/672* (2013.01); *C08G 63/6886* (2013.01); *C08G 63/78* (2013.01); *C08G 81/027* (2013.01); *C08K 5/09* (2013.01); *C08L 67/02* (2013.01); *D01F 1/02* (2013.01); *D01F 6/62* (2013.01); *D06P 3/52* (2013.01); *C08J 2367/02* (2013.01); *C08J 2467/02* (2013.01); *C08L 2203/12* (2013.01); *C08L 2310/00* (2013.01)

(58) Field of Classification Search
None
See application file for complete search history.

(56) References Cited

U.S. PATENT DOCUMENTS

| | | | |
|---|---|---|---|
| 2,895,946 A | 7/1959 | Huffman | |
| 3,033,824 A | 5/1962 | Huffman | |
| 3,671,379 A | 6/1972 | Evans et al. | |
| 3,763,109 A * | 10/1973 | Witsiepe | C08G 63/672 528/301 |
| 3,856,753 A | 12/1974 | Henry et al. | |
| 4,117,033 A * | 9/1978 | Gale | C08L 59/02 524/100 |
| 4,349,469 A * | 9/1982 | Davis | C08G 63/66 524/747 |
| 5,916,677 A | 6/1999 | Chen et al. | |
| 6,291,066 B1 | 9/2001 | Branum | |
| 6,294,254 B1 | 9/2001 | Nichols et al. | |
| 6,454,982 B1 | 9/2002 | Branum | |
| 6,485,829 B2 | 11/2002 | Nichols et al. | |
| 6,692,687 B2 | 2/2004 | Chang et al. | |
| 7,357,985 B2 | 4/2008 | Kurian et al. | |
| 2001/0027244 A1* | 10/2001 | Branum | C08G 63/668 528/300 |
| 2003/0129398 A1* | 7/2003 | Gallucci | D01F 1/04 428/375 |
| 2003/0146536 A1* | 8/2003 | Sunderland | C08L 77/00 264/172.17 |

FOREIGN PATENT DOCUMENTS

| | | | |
|---|---|---|---|
| JP | 2007169856 A * | 7/2007 | |
| WO | 2008034477 A1 | 3/2008 | |
| WO | 2012011120 A1 | 1/2012 | |
| WO | 2015124959 A1 | 8/2015 | |

OTHER PUBLICATIONS

English Machine Translation of JP2007169856, prepared Nov. 16, 2020. (Year: 2020).*
International Search report for PCT/IN2016/050442 dated May 17, 2017.
Zhang et al., "Dyeing Behavior and Mechanism of PTT and Pet fiber," Journal of Textile Research (China), vol. 28 (7), Jul. 2007, pp. 68-72 (Abstract only in English).

* cited by examiner

*Primary Examiner* — Christopher M Rodd
(74) *Attorney, Agent, or Firm* — Lerner, David, Littenberg, Krumholz & Mentlik, LLP

(57) ABSTRACT

The present invention provide a polyester masterbatch comprising: at least one dicarboxylic acid or ester thereof; at least one diol; at least one high molecular weight polyalkylene glycol up to 60%; optionally DMSIP/SIPA up to 40%; at least one antioxidant up to 1.0%; and at least one or more additives up to 20%; which provides an environment friendly, cost effective, superior and easy dye ability solution for various polyesters.

15 Claims, 1 Drawing Sheet

| Dyeing Effect and Dye Bath Exhaustion as achieved in Yarn made from conventional cationic chips | Dyeing Effect and Dye Bath Exhaustion as achieved in Yarn made from 10% masterbatch of Example 1 + 90% of Normal PET |
|---|---|
| 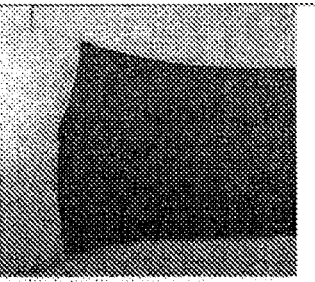 | 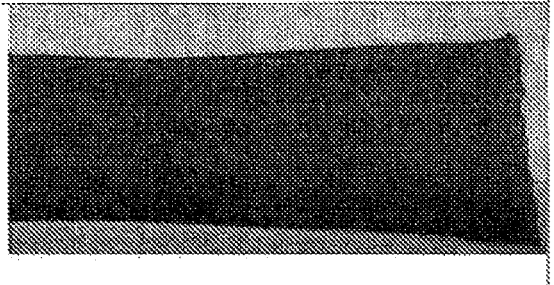 |
| Light Green Color, Dye bath exhaustion: 70% | Dark Green Color, Dye bath exhaustion: 97% |
| Dyeing Effect and Dye Bath Exhaustion as achieved in Yarn made from standard PET chips | Dyeing Effect and Dye Bath Exhaustion as achieved in Yarn made from 10% masterbatch of Example 2 + 90% of Normal PET |
| 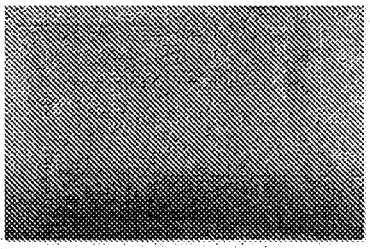 | 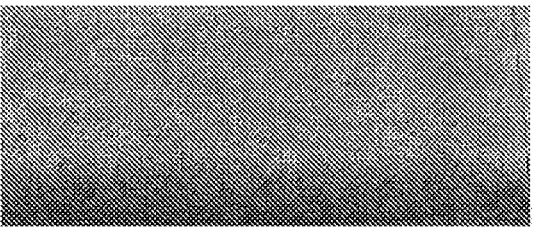 |
| Light Yellow Color, Dye bath exhaustion: 67% Temperature of Dyeing: 130°C | Dark Yellow color, Dye bath exhaustion: 90% Temperature of Dyeing: 99°C |

MODIFIED POLYESTER MASTERBATCH FOR TEXTILE APPLICATIONS AND MANUFACTURING PROCESS THEREOF

CROSS-REFERENCE TO RELATED APPLICATIONS

The present application is a national phase entry under 35 U.S.C. § 371 of International Application No. PCT/IN2016/050442 filed Dec. 14, 2016, published in English, which claims priority from Indian Patent Application No. 201611030858 filed Sep. 9, 2016, all of which are incorporated herein by reference.

FIELD OF THE INVENTION

The present invention relates to a masterbatch prepared by modification of various polyesters (polyethylene terephthalate (PET), polybutylene terephthalate(PBT), polytrimethylene terephthalate (PTT)) with additional co-monomers comprising of high molecular weight polyalkylene glycol, optional presence of DMSIP or SIPA and other additives. The masterbatch produced in the present invention provides an environment friendly, cost effective, superior and easy dye ability solution for various polyesters. Additionally, the polyesters obtained by using the masterbatch of the present invention have improved soft feel, texture and cooling effect.

BACKGROUND OF THE INVENTION

The most common polyester being used for textile purposes is PET. It is also widely used in packaging industry in form of various food and beverage containers. PTT and PBT have also received much attention as a polymer for use in textiles, flooring, packaging and other end uses.

It is desirable that the textile fabric should be produced in a variety of colors, such colors may be achieved by dyeing of yarns or fabrics or the fabric may go for printing to get desired shade/print.

The PET fibers are generally dyed with a disperse dye as there are no reactive end groups available in PET. PET fibers, because of high crystallinity and compact structure are required to be dyed at high-temperature (at about 130° C.) and high-pressure using needful carriers, so that disperse dye/reactive dye can enter polymer matrix.

Since poor dyeing of PET fibers make the handling and operations of instruments complicated and the process becomes expensive due to high energy consumption. In addition time required for dyeing of PET is high. Also, the dye bath exhaustion is not complete, resulting into high dyestuff requirement and various environment concerns due to residual dyes remaining in the dye bath. In addition, when PET fibers are dyed in the same dyeing bath in combination with other fibers, especially acrylic fibers, cotton, wool or the like, by the high-temperature and high-pressure dyeing methods, the physical properties of the other fibers are deteriorated. PET yarns/fibers have rough feel unlike cotton/wool. And last but not the least, it is difficult to get deeper and darker dye shades.

The PBT and PTT polyesters are easy dyeable in comparison to PET because of their zig-zag molecular structure, but improvement in dyeability is desirable for PBT and PTT polyesters as well.

JOURNAL OF TEXTILE RESEARCH 2007, Vol. 28 Issue (7): 69-72 describes dyeing behavior and mechanism of PTT and PET fiber.

U.S. Pat. No. 2,895,946 discloses methods for improving dye ability of the polyester resin fibers by employing chain terminating and chain branching agents. In US '946 only Eastman Blue GLT dye has been used showing the affinity of polyester towards acetate dyes.

U.S. Pat. No. 3,033,824 discloses methods for improving dye ability of the polyester resin fibers by employing difunctional modifiers. In US '824 the affinity for dispersed acetate dyestuffs and basic dyes improves but the viscosity of the polymer is in the range of 0.3 to 0.6 and the polymer obtained is brittle in nature and has no mechanical strength.

U.S. Pat. No. 3,856,753 employs the use of repeating sulfonate group containing comonomer dye sensitizing units such as the sodium salt of N-methyl-N(3,5-dicarbomethoxy) benzenesulfonyl taurine, wherein the intrinsic viscosity of the polymer is in the range of 0.38 to 0.48 dl/g.

U.S. Pat. No. 5,916,677 discloses 2-methyl-1,3-propanediol modified polyethylene terephthalate fiber having improved dye ability, elongation and fiber strength.

U.S. Pat. Nos. 3,671,379 and 6,692,687 disclose bi-component polyester textile fibers wherein one of the components can be PTT and other can be PET. US '379 discloses a helically crimpable composite filament comprising assembly of at least two synthetic polyesters and US '687 covers a process for preparing a fully drawn crimped bi-component fiber.

U.S. Pat. No. 7,357,985 discloses bi-component fiber comprising of PTT and PEG in its specification but in examples bi-component fiber is made by using PTT and Poly(tetramethylene ether) glycol.

U.S. Pat. Nos. 6,454,982, 6,291,066, 6,485,829 and 6,294,254 disclose PEG modified polyester that can be spun into filaments, wherein presence of branching agents is non-essential. The methods provided in said US patents include the steps of copolymerizing PEG into PET in the melt phase to form copolyester composition, then polymerizing the copolyester composition in the solid phase until the copolyester is capable of achieving a melt viscosity that facilitates the spinning of filaments. However, the concept of dyeing is not covered in said patents.

All the above cited references are either related to various methods for improving the dye ability of PET or preparation of a bi-component textile fiber. None of the documents is able to provide an alternate for easy, cost effective, environment friendly, less time consuming, deep dyeable polyester, wherein dyeing is done at temperature below 100° C. and atmospheric pressure with disperse/cationic dyes using a polyester masterbatch.

Polyester industry is still striving to render a process/product which provides a cost effective, environment friendly solution for easy and deep dyeing both by disperse dyes and by cationic (reactive) dyes at atmospheric pressure and temperature below 100° C.

Therefore, in light of the market requirement, there is a felt need for modifying a polyester that is dyeable easily at the ambient conditions without change in the inherent properties of the polyester and which is easily miscible in all types of polyester (PET/PBT/PTT) matrix in contrast to the polymers available in market, wherein different chips are to be used for different luster and different polyesters. Further, there is a need for a process for preparing polyester masterbatch that is capable of deep color dyeing at atmospheric pressure and temperature below 100° C.

OBJECTIVES OF THE INVENTION

An object of the present invention is to develop a polyester masterbatch which can be used in required proportion along with regular polyesters to impart deeper and darker shades using disperse dyes/reactive dyes and can be dyed at atmospheric pressure and temperatures below 100° C.

Another object of the present invention is to develop a polyester masterbatch using various Poly ethylene glycol (PEG) (of molecular weight up to 5000 g/mol), which is added up to 60 wt % and DMSIP/SIPA up to 40 wt %.

Still further object of the present invention is to provide a cost effective, time saving and environment friendly alternate of dyeing, wherein a masterbatch can be used in required proportion along with regular polyesters to impart darker and deeper dyeing using disperse dyes/reactive dyes and can be dyed at atmospheric pressure and temperatures below 100° C., wherein improved dye bath exhaustion is achieved. Dye bath exhaustion is >90% in comparison to traditional process wherein 60-70% exhaustion occurs.

Another object of the present invention is to improve the dyeability—without influencing the mechanical properties like tenacity and elongation of PFY/PSF/BCF produced using PTT or/and PET.

Still another object of the present invention is to provide dark and deep dyeing polyester masterbatch, which when blended with other polyesters provide better appearance, soft feel, and has performance closer to natural polymers.

Another object of the present invention is to manufacture a polyester masterbatch, which provides dark and deep dye ability and provides dosing flexibility i.e. can be added at any stage in the process. For example which can be blended with normal PET at dryer inlet, which can be dried, molten in side feeder and dosed in extruder or which can be dried, molten in extruder and injected in polymer melt line.

Still another object of the present invention is to provide a polyester masterbatch, which can be used for differential dyeing in fabric made by PFY/PSF/BCF route.

Further, another object of the present invention is to provide a polyester masterbatch, which can be used with both reactive dyes as well as disperse dyes simultaneously in the same dye bath.

Another object of the present invention is to modify virgin PET/RPET in textile application.

BRIEF DESCRIPTION OF DRAWING

FIG. 1: Images of yarn samples provided to show the dyeing effect using masterbatch blended with PET along with dyebath exhaustion details

SUMMARY OF THE INVENTION

The present invention relates to a polyester masterbatch which can be used in required proportion along with regular polyesters/RPET in application for PFY/PSF/BCF to impart deeper and darker dyeing using disperse dyes/reactive dyes and can be dyed at atmospheric pressure and temperatures below 100° C.

The polyester masterbatch comprises: at least one dicarboxylic acid or ester thereof; at least one diol; at least one high molecular weight polyalkylene glycol up to 60%; optionally DMSIP/SIPA up to 40%, at least one antioxidant up to 1.0%; and at least one or more additives up to 20%.

The masterbatch obtained with the present invention provides dark and deep dye ability, better appearance as well as soft feel to polyesters. The masterbatch can be blended up to the range of 30% with polyesters (viz. PET, PTT, PBT, PEN) and other co-polyesters, without influencing the mechanical properties of the polyester.

The polyester masterbatch produced in the present invention provides a cost effective, time saving, environment friendly process for dark and deep dyeing of various polyesters. The differential dyeing can be easily achieved using the master batch prepared by the process of present invention. The masterbatch produced in the present invention can be blended at any stage of spinning process of the polyesters. The polyester masterbatch produced in the present invention is crystalline in nature and can also be used with drying at recommended temperature. Also, the masterbatch produced in the present invention can be used with reactive as well as disperse dyes simultaneously.

The polyester masterbatch produced in the present invention can be blended with any polyester to provide dark and deep dye ability, it further improves the texture of fabric. By adjusting the proportion of masterbatch in polyester, variation in soft feel can be achieved.

Various embodiments are described hereinafter. It should be noted that the specific embodiments are not intended as an exhaustive description or as a limitation to the broader aspects discussed herein. One aspect described in conjunction with a particular embodiment is not necessarily limited to that embodiment and can be practiced with any other embodiment(s).

DETAILED DESCRIPTION OF THE INVENTION

Definition of Terms

For convenience, before further description of the present invention, certain terms employed in the specification, examples and appended claims are collected here. These definitions should be read in light of the remainder of the disclosure and understood as by a person of skill in the art. Unless defined otherwise, all technical and scientific terms used herein have the same meaning as commonly understood by a person of ordinary skill in the art.

The articles "a", "an" and "the" are used to refer to one or to more than one (i.e., to at least one) of the grammatical object of the article.

Throughout this specification, unless the context requires otherwise the word "comprise", and variations such as "comprises" and "comprising", will be understood to imply the inclusion of a stated element or step or group of element or steps but not the exclusion of any other element or step or group of element or steps.

The term "including" is used to mean "including but not limited to". "Including" and "including but not limited to" are used interchangeably.

The term "polyester" generally refers to an esterification or reaction product between a polybasic organic acid and a polyol. The present disclosure is particularly directed to a class of polyesters referred to herein as polyethylene terephthalate, in which terephthalic acid serves as the polybasic organic acid, and particularly to PET, but it should be understood that the disclosure is not in any way limited to PET. It covers all polyesters viz PET, PBT, PTT and their allied co-polyesters blends and alloys.

The term "co-polymer" refers to blends of PET with PBT/PTT in any desired ratio. The term "co-polymer" or "co-polyester" can be used interchangeably.

The term "polyester resin" refers to a polyester having a structure obtained through polycondensation of a dicarboxylic acid compound with residues, such as sulfonated hydroxyl terminated ester and sulfonated carboxyl terminated ester with a dihydroxy compound, polycondensation of a hydroxy-carboxylic acid compound, or polycondensation of the above three compounds, etc. The polyester resin may be any one of a homo-polyester or a copolyester.

The term "complete exhaustion" refers to exhaustion of dye bath more than 80%, more preferably the exhaustion of dye bath more than 90%.

Ratios, concentrations, amounts, and other numerical data may be presented herein in a range format. It is to be understood that such range format is used merely for convenience and brevity and should be interpreted flexibly to include not only the numerical values explicitly recited as the limits of the range, but also to include all the individual numerical values or sub-ranges encompassed within that range as if each numerical value and sub-range is explicitly recited. For example, 5 to 40 mole % should be interpreted to include not only the explicitly recited limits of 5 to 40 mole %, but also to include sub-ranges, such as 10 mole % to 30 mole %, 7 mole % to 25 mole %, and so forth, as well as individual amounts, including fractional amounts, within the specified ranges, such as 15.5 mole %, 29.1 mole %, and 12.9 mole %, for example.

Masterbatch is a concentrated mixture of co-monomers, pigments and/or additives encapsulated during a heat process into a carrier resin which is then cooled and cut into a granular shape.

Suitable coloring agents for use in fibers are known in the art and may include, but are not limited to dyes, inorganic or organic pigments, or mixtures of these.

In some embodiments, the coloring agents include dyes selected from the group consisting of azo, azomethine, methine, anthraquinone, phthalocyanine, dioxazine, flavanthrone, indanthrone, anthrapyrimidine and metal complex dyes.

In one embodiment the coloring agent is selected from the group consisting of metal oxides, mixed metal oxides, metal sulfides, zinc ferrites, sodium alumino sulfo-silicate pigments, carbon blacks, phthalocyanines, quinacridones, nickel azo compounds, mono azo coloring agents, anthraquinones and perylenes.

In some embodiments, the coloring agent is selected from the group consisting of Solvent Blue 132, Solvent Yellow 21, Solvent Red 225, Solvent Red 214 and Solvent Violet 46, Carbon Black, Titanium Dioxide, Zinc Sulfide, Zinc Oxide, Ultramarine Blue, Cobalt Aluminate, Iron Oxides, Pigment Blue 15, Pigment Blue 60, Pigment Brown 24, Pigment Red 122, Pigment Red 147, Pigment Red 149, Pigment Red 177, Pigment Red 178, Pigment Red 179, Pigment Red 202, Pigment Red 272, Pigment Violet 19, Pigment Violet 29, Pigment Green 7, Pigment Yellow 119, Pigment Yellow 147 and Pigment Yellow 150, or a combination thereof.

Depending on the desired color and shade, any number of different coloring agents in varying proportions may be used. In some embodiments, the coloring agent may constitute from about 0.001 wt %, about 0.01 wt %, about 0.1 wt %, about 0.5 wt %, about 1 wt %, about 2 wt %, about 5 wt %, about 8 wt %, about 10 wt %, about 15 wt %, about 20 wt %, about 25 wt %, about 30 wt %, about 40 wt %, about 50 wt % of the total composition, and ranges between any two of these values or less than any one of these values. However, other amounts are possible. The particular amount depends upon the desired color of the fiber composition. In some embodiments, the composition includes about 0.01 wt % to about 10 wt % of the coloring agent.

In some embodiments, the masterbatch of the modified copolyester is utilized for making colored and deep shades of fabric or yarns, and plastic components. In some embodiments, the masterbatch is utilized for making deep and bright colored fibers by using at least one extrusion and spinning method selected from the group consisting of heat set blow molding method and cold set blow molding method.

The masterbatch copolyester and polymer compositions described herein can be utilized for various applications. Typical end-use applications include, but are not limited to, extruded and non-extruded fibers and yarns for various applications such as for example, apparel fabric, drapery, upholstery, wall coverings, heavy industrial fabrics, ropes, cords, shoe laces, nettings, carpets and rugs.

The use of the expression "at least" or "at least one" suggests the use of one or more elements or ingredients or quantities, as the use may be in the embodiment of the disclosure to achieve one or more of the desired objects or results.

Any discussion of documents, acts, materials, devices, articles and the like that has been included in this specification is solely for the purpose of providing a context for the disclosure. It is not to be taken as an admission that any or all of these matters form a part of the prior art base or were common general knowledge in the field relevant to the disclosure as it existed anywhere before the priority date of this application.

While considerable emphasis has been placed herein on the particular features of this disclosure, it will be appreciated that various modifications can be made, and that many changes can be made in the preferred embodiments without departing from the principles of the disclosure. These and other modifications in the nature of the disclosure or the preferred embodiments will be apparent to those skilled in the art from the disclosure herein, whereby it is to be distinctly understood that the foregoing descriptive matter is to be interpreted merely as illustrative of the disclosure and not as a limitation.

Abbreviations Used in the Invention

| | |
|---|---|
| PET | Polyethylene Terephthalate |
| RPET | Recycled Polyethylene Terephthalate |
| PBT | Polybutylene Terephthalate |
| PTT | Polytrimethylene Terephthalate |
| PEN | Polyethylene Naphthalate |
| PTA | Purified Terephthalic acid |
| MEG | Mono ethylene glycol |
| DEG | Diethylene glycol |
| DMSIP | bis(2-hydroxyethyl) sodium 5-sulfoisophthalate |
| SIPA | Isophthalic acid sulfonate |
| PEG | Polyethylene glycol |
| PDO | Propanediol |
| BDO | Butanediol |
| PMDA | Pyrometillic dianhydride |
| PFY | Polyester filament yarn |
| PSF | Polyester staple fiber |
| BCF | Bulk continuous Fiber |
| SSP | Solid state polymerization |
| I.V. | Intrinsic viscosity |
| dl/gm | Deciliters per gram |
| meq/kg | Milliequivalents/kilogram |
| Wt % | Weight percentage |
| $T_g$ | Glass transition temperature |
| $T_{ch}$ | Crystallization temperature |
| $T_m$ | Melting temperature |

In one aspect, a polyester masterbatch which can be used in required proportion along with regular polyesters to impart darker and deeper dyeing using disperse dyes/reactive dyes and can be dyed at atmospheric pressure and temperatures below 100° C. is provided.

The masterbatch polyester composition may comprise of: at least one dicarboxylic acid or ester thereof; at least one diol; at least one polyalkylene glycol of high molecular weight (with molecular weights of about 200 to 5000 g/mol) up to 60%, optionally DMSIP/SIPA up to 40%, at least one antioxidant up to 1.0%; and other needful catalysts/additives up to 20%.

The polyester masterbatch can be prepared either by esterifying a dicarboxylic acid or ester with a diol in presence of an antioxidant and other required catalysts at about 200-270° C., after completion of around 80-90% esterification, the reactor is depressurized and high molecular weight polyalkylene glycol is added; or by preparing a sulfonated (DMSIP/SIPA) co-polyester and glycol modified co-polyester in separate pots and then blending them with each other.

In yet another embodiment of the invention, the present invention provides a process for producing polyester masterbatch, wherein esterification of a dicarboxylic acid or ester is carried out with a diol at about 200-270° C., further up to 60% of high molecular weight polyalkylene glycol is added and polycondensation reaction is carried out at about 230-280° C.

In one another embodiment of the invention, the present invention provides a process for producing polyester masterbatch, wherein sulfonated (DMSIP/SIPA) co-polyester and glycol modified co-polyester are prepared in separate pots and then blended with each other.

The dicarboxylic acid useful for obtaining the polyester is at least one selected from aromatic and/or aliphatic acid The acid is at least one selected from the group consisting of terephthalic acid, isophthalic acid, 2,6-napthalene dicarboxylic acid, 3,4'-diphenyl ether dicarboxylic acid, hexahydrophthalic acid, 2,7-naphthalenedicarboxylic acid, phthalic acid, 4,4'-methylenebis(benzoic acid), oxalic acid, malonic acid, succinic acid, methylsuccinic acid, glutaric acid, adipic acid, 3-methyladipic acid, pimelic acid, suberic acid, azelaic acid, sebacic acid, 1,11-undecanedicarboxylic acid, 1,10-decanedicarboxylic acid, undecanedioic acid, 1,12-dodecanedicarboxylic acid, hexadecanedioic acid, docosanedioic acid, tetracosanedioic acid, dimer acid, 1,4-cyclohexanedicarboxylic acid, 1,3-cyclohexanedicarboxylic acid, 1,1-cyclohexanediacetic acid, fumaric acid, maleic acid, and hexahydrophthalic acid whereas the ester of dicarboxylic acid that can be used for obtaining the polyester is at least one selected from the group consisting of dimethyl terephthalate, dimethyl isophthalate, dimethyl-2,6-naphthalate, dimethyl-3,4'-diphenyl ether dicarboxylate, dimethyl hexahydrophthalate, dimethyl-2,7-naphthalate, dimethyl phthalate dimethyl-4,4'-methylenebis(benzoate), dimethyl oxalate, dimethyl malonate, dimethyl succinate, dimethyl glutarate, dimethyl adipate, dimethyl azelate, dimethyl-1,3-cyclohexanedicarboxylate and 5-sulfo-dimethylisophalate.

Preferably the dicarboxylic acid/ester used in the present invention is purified terephthalic acid (PTA) or dimethyl terephthalate (DMT).

The diol used in the polyester is at least one selected from aliphatic or cyclic or aromatic diol. The diol is at least one selected the group consisting of mono ethylene glycol (MEG), diethylene glycol, 1,3-propanediol, 1,4-butanediol, 1,6-hexanediol, 1,8-octanediol, 1,10-decanediol, 1,12-dodecanediol, 1,14-tetradecanediol, 1,16-hexadecanediol, dimer diol, (cis, trans) 1,4-cyclohexanedimethanol, di(ethylene glycol), tri(ethylene glycol), poly(ethylene ether) glycols, poly(butylene ether) glycols, branched diols, hexane diol or combinations or derivatives thereof.

Preferably the diols can be selected from ethylene glycol, 1,3-propanediol or 1,4-butanediol.

The polyalkylene glycol is selected from the group consisting of polyethylene glycol, polypropylene glycol ethylene oxide propylene oxide block copolymers, or combination thereof. Preferably the polyalkylene glycol used in present invention is Polyethylene glycol (PEG) with molecular weights about 200 to 5000 g/mol Polyethylene glycol amounts may be added up to 60 weight percent. Preferably up to 30 weight percent.

The antioxidants include but are not limited to irganox 1010 (PentaerythritolTetrakis(3-(3,5-di-tert-butyl-4-hydroxyphenyl)propionate), irganox 1076 (Octadecyl-3-(3,5-di-tert.butyl-4-hydroxyphenyl)-propionate), irgafos 126 (Bis-(2,4-di-t-butylphenol) PentaerythritolDiphosphite) and irgafos 168 (Tris(2,4-ditert-butylphenyl)phosphite. Antioxidant may be added up to 1.0 weight percent.

The catalysts that may be used in the range of up to 20 weight percent. Such catalysts may include salts or adducts of lithium, calcium, magnesium, manganese, zinc, lead, antimony, tin, germanium, titanium and the like. The salts or adducts may include acetates, oxides, glycol adducts, and alkoxides. Preferably the catalysts maybe selected from zinc acetate, antimony trioxide, barium sulphate, sodium acetate, triphenyl phosphine, aluminium sulphate, cobalt acetate, titanium dioxide and the like.

The additives may also be added in the range of up to 20 weight percent before or during or after the polymerization reaction to impart requisite property to the resulting polyester. Preferably up to 5 weight percent. Such additives include but are not limited to pigments; flame retardant additives such as decabromodiphenyl ether and triarylphosphates, triphenylphosphate. Reinforcing agents such as glass fibers. Thermal stabilizers, for example thermal conductivity improvers (for PET) such as zinc oxide, titanium dioxide (available as Altris 500 from Huntsman). Ultraviolet light stabilizers such as resorcinol monobenzoates, phenyl salicylate and 2-hydroxybenzophenones; Hindered amine light stabilizers (HALS) such as benzotriazole, benzophenone, oxalanilide, cerium dioxide. Impact modifiers, flow enhancing additives, ionomers, liquid crystal polymers, fluoropolymers, olefins including cyclic olefins, polyamides and ethylene vinyl acetate copolymers. Stabilizing agents such as ortho-phosphoric acid, trimethylphosphate (TMP), triphynylphosphate (TPP) and triethylphosphono acetate (TEPA). Delustering agent such as titanium dioxide. Carriers such as o-phenylphenol, p-phenylphenol, o-dichlorobenzene, trichlorobenzene, monochlorobenzene, biphenyl, methyl salicylate, butyl benzoate, benzyl benzoate, benzoic acid, benzalacetone, methyl cinnamate, Marcron L (a commercially available phenolic dye carrier). Levelling agents such asbishydroxymethyloxazoline, diaryl ethers, ditolyl ether, sodium or a di-naphthylmethane-B, B disulfonate, ammonium dodecylbenzene sulfonate, or sodium tetrapropylbenzene sulfonate, homopolymers or oligomers of N-vinyl pyrrolidone, POLY-TERGENT CS-1, AVOLAN® IS, AVOLAN® IS Liquid, LEVEGAL® BLD, Poly tetrahydrofuran. Porosity additives (for PET) such as Metal oxalate complexes (e.g. $K_3 Al(C_2O_4)_3$), organic sulphonate salts, Jade powder ($(Na,Ca)(Al,Fe)Si_2O_6$), zeolite powder ($Ca_2(Mg, Fe)_5Si_8O_{22}(OH)_2$).

The polymerization reaction can be carried out by esterifying a dicarboxylic acid or ester with a diol in presence of an antioxidant and other required catalysts at about 200-270° C., after completion of around 80-90% esterification, the reactor is depressurized and high molecular weight polyalkylene glycol is added. Polycondensation reaction is carried out at about 230-280° C.; The polyester manufactured in polymerization reaction can be crystallized in any conventional crystallizer and subsequently processed in batch or continuous solid state polymerization (SSP) to get the desired intrinsic viscosity (I.V.). The batch SSP may be purged with nitrogen to expedite the reaction. In continuous SSP the circulating nitrogen gas is used as a carrier of by-products. The melt phase polymerization can be accomplished in batch reactor or continuous processing reactor.

The present invention provides a masterbatch which may be blended in PET/PBT/PTT to improve dyeing of polyesters. The polymer morphology is modified in such a way that dye molecule can easily diffuse and mix in polymer matrix. Incorporation of said master batch reduces glass transition temperature and overall crystallinity of polymer enabling dye molecule (disperse/reactive dyes) to uniformly blend in polymer matrix. Said polyesters can be used in textile applications such as preparing curtains, carpets, bed covers, linens etc., apparels or plastics.

The improved polyester fibers dyed by the present masterbatch exhibit important industrial applications.

The embodiments herein and the various features and advantageous details thereof are explained with reference to the non-limiting embodiments in the description. Descriptions of well-known components and processing techniques are omitted so as to not unnecessarily obscure the embodiments herein. The examples used herein are intended merely to facilitate an understanding of ways in which the embodiments herein may be practiced and to further enable those of skill in the art to practice the embodiments herein. Accordingly, the examples should not be construed as limiting the scope of the embodiments herein.

The foregoing description of the specific embodiments will so fully reveal the general nature of the embodiments herein that others can, by applying current knowledge, readily modify and/or adapt for various applications such specific embodiments without departing from the generic concept, and, therefore, such adaptations and modifications should and are intended to be comprehended within the meaning and range of equivalents of the disclosed embodiments. It is to be understood that the phraseology or terminology employed herein is for the purpose of description and not of limitation. Therefore, while the embodiments herein have been described in terms of preferred embodiments, those skilled in the art will recognize that the embodiments herein can be practiced with modification within the spirit and scope of the embodiments as described herein.

Physical Parameters
Intrinsic Viscosity

Intrinsic viscosity (I.V.) is a measure of the molecular mass of the polymer and is measured by dilute solution using an Ubbelohde viscometer. All intrinsic viscosities are measured in a 60:40 mixture of phenol and s-tetrachloroethane with 0.5% concentration. The flow time of solvent and solution are checked under I.V. water bath maintained 25° C. The I.V., η, was obtained from the measurement of relative viscosity, ηr, for a single polymer concentration by using the Billmeyer equation:

$$IV=[\eta]=0.25[(RV-1)+3 \ln RV]/c$$

Wherein η is the intrinsic viscosity, RV is the relative viscosity; and c is the concentration of the polymeric solution (in g/dL). The relative viscosity (RV) is obtained from the ratio between the flow times of the solution (t) and the flow time of the pure solvent mixture ($t_0$).

$$RV=n_{rel}=\text{Flow time of solution }(t)/\text{Flow time of solvent }(t_0)$$

I.V. must be controlled so that process ability and end properties of a polymer remain in the desired range. Class 'A' certified burette being used for IV measurement for more accuracy.

Color

The color parameters were measured with a Hunter Lab Ultrascan VIS instrument. D65 illuminant and 10° angle is being used for color measurement. Both Amorphous and Solid state polymerized chips (SSP) were used to check by reflectance mode of Hunter color scan. Generally, the changes measured could also be seen by eye. The color of the transparent amorphous/SSP chips was categorized using the Hunter Scale (L/a/b) & CIE Scale (L*/a*/b*) values which are based on the Opponent-Color theory. This theory assumes that the receptors in the human eye perceive color as the following pairs of opposites.

L/L* scale: Light vs. dark where a low number (0-50) indicates dark and a high number (51-100) indicates light.

a/a* scale: Red vs. green where a positive number indicates red and a negative number indicates green.

b/b* scale: Yellow vs. blue where a positive number indicates yellow and a negative number indicates blue.

The L* values after SSP are higher because of whitening caused by spherulitic crystallization of the polymer.

COOH End Groups:

The Polymer was dissolved in a mixture of phenol and chloroform (50:50 w/v) under reflux conditions. After cooling to room temperature, the COOH end groups were determined using titration against 0.025 N Benzyl alcoholic KOH solution with bromophenol blue as an indicator. Run a blank simultaneously along with sample and the final end point is at the color change from blue from yellow. COOH groups are calculated based on the below calculation and the results are expressed in meq of COOH/kg. In the equation, TR is the volume of benzyl alcoholic KOH consumed for the sample, N is the normality of benzyl alcoholic KOH, and the blank is the volume of benzyl alcoholic KOH consumed for sample solution.

$$[(TR-Blank)\times N\times 1000]=COOH \text{ end groups (meq/kg)}$$

DEG/EG/IPA/BDO Content:

To determine the Diethylene Glycol (DEG), Ethylene Glycol (EG), Isophthalic Acid (IPA) and Butanediol (BDO) in sulfonated co-polyesters, Polymer sample is trans-esterified with methanol in an autoclave at 200° C. for 2.5 hours with zinc acetate as a catalyst.

During methanolysis, the polymer sample is depolymerized and the liquid is filter through Whatman 42 filter paper. After filtration, 1 micro liter of the liquid was injected in Agilent Gas Chromatography (GC) under controlled GC configuration. Based on the RT (Retention Time), DEG/EG/IPA/BDO are calculated with internal standard ISTD (tetraethylene glycol dimethyl ether) and results are declared as wt %.

Dye Bath Exhaustion:

The polymer was meshed and was dyed in a dyebath having variation in the proportion of dye at different temperatures and for different time span (Details provided in Table 3). The polymer was removed from the bath, filtered, washed and the filtrate was analyzed to determine the amount of dye removed from the bath by the polymer.

The soft feel of polyester can be measured through ST300 Softness Tester: wherein deflection of the material whilst clamped above an aperture of a known diameter is measured when subjected to a specific load applied by a pin of a smaller diameter.

EXAMPLES

Example 1: Preparation of Sulfonated Co-Polyester

To a 250 liter volume reactor equipped with a mechanical stirrer, a packed refluxing column, a nitrogen inlet and a heat source were added 25.3 kg of ethylene glycol, 58.4 kg of terephthalic acid, 22.95 g of antimony trioxide (240 ppm as antimony), 40 g of Pentaerythritol (500 wt. ppm) 20 g of sodium acetate (250 ppm as sodium acetate) and TEPA (200 wt. ppm). Esterification was carried out at temperature of 240-260° C. under pressure up to 3.0 bars for 2-3 hours. After completion of 90% esterification, the reactor was depressurized and phosphoric acid was added. The pre-polymer was transferred into polycondensation reactor. PEG 1500 filtered solution (20% by weight) was added and the reaction mixture was hold for 10 minutes for mixing. Sulfonated hydroxyl terminated ester, such as bis(2-hydroxyethyl) sodium 5-sulfoisophthalate solution (Preparation given in Example 1a) was added. And the reaction mixture was hold for 10 minutes for mixing. Polycondensation reaction was carried out at temperature of 280-290° C. under pressure of less than 0.2 torr. After sufficient melt viscosity was achieved, polymerization was stopped. The molten polymer was cooled in the cold water and then chopped to form pellets. The intrinsic viscosity of the amorphous polymer was 0.734 dl/g and throughput of product from reactor was more than 98% (yield).

Example 1a: Preparation of bis(2-hydroxyethyl) Sodium 5-sulfoisophthalate Monomer The bis(2-hydroxyethyl) sodium 5-sulfoisophthalate used in herein was prepared separately as mentioned in the JP patent application 57023627 A.

In a separate reactor, 2.8 kg of NaDMSIP (sodium salt of dimethyl-5-sulfoisophthalate) and 8.4 kg of ethylene 25 glycol (three times on NaDMSIP) were mixed to form a solution and 0.1 wt % sodium acetate (with respect to NaDMSIP) was added to the solution and the solution was stirred at a temperature up to 185° C. for 90 minutes. The by-product, i.e., methanol was collected and then solution was kept as such for one hour at 200° C. to ensure complete conversion. The reaction mixture was allowed to cool and filtered to obtain a solid which was used as such without any further purification.

Example 2: Preparation of Glycol Modified Co-Polyester Having Dark Dye Pick Up Using Ethylene Glycol To a 100 liter volume reactor equipped with a mechanical stirrer, a packed refluxing column, a nitrogen inlet and a heat source were added 4.8 kg of ethylene glycol, 11.0 kg of terephthalic acid, 4.66 g of antimony trioxide (260 ppm as antimony), 3.48 g of cobalt acetate (60 ppm as cobalt), 6.0 g of pentaerythritol (400 wt. ppm), 12 g of PMDA (800 wt. ppm) and 75 g of Irganox 1010 (0.5 wt. %). Esterification was carried out at temperature of 240-260° C. under pressure up to 3.0 bars for 2 to 3 hours. After completion of 90% esterification, the reactor was depressurized and phosphoric acid was added. The pre-polymer was transferred into poly-condensation reactor. PEG 1500 filtered solution (30% by weight) was added and the reaction mixture was hold for 10 minutes for mixing. Polycondensation reaction was carried out at temperature of 280-290° C. under pressure of less than 0.2 torr. After sufficient melt viscosity was achieved, polymerization was stopped. The molten polymer was cooled in the cold water and then chopped to form pellets. The intrinsic viscosity of the amorphous polymer was 0.801 dl/g and throughput of product from reactor was more than 98% (yield).

Example 3: Preparation of Glycol Modified Co-Polyester Having Dark Dye Pick Up Using 1,3-propanediol To a 100 liter volume reactor equipped with a mechanical stirrer, a packed refluxing column, a nitrogen inlet and a heat source were added 5.1 kg of 1,3-propanediol, 9.7 kg of terephthalic acid, 1.16 g of cobalt acetate (20 ppm as cobalt), 4.5 g of pentaerythritol (300 wt. ppm), and 4.5 g of Irganox 1076 (0.03 wt. %). Esterification was carried out at temperature of 240-260° C. under pressure up to 3.0 bars for 2 to 3 hours. After completion of 90% esterification, the reactor was depressurized and $T_nBT$ (tetra-n-butyl titanate, 50 ppm) was added. The pre-polymer was transferred into polycondensation reactor. PEG 1500 filtered solution (20% by weight) was added and the reaction mixture was hold for 10 minutes for mixing. Polycondensation reaction was carried out at temperature of 250-270° C. under pressure of less than 0.2 torr. After sufficient melt viscosity was achieved, polymerization was stopped. The molten polymer was cooled in the cold water and then chopped to form pellets. The intrinsic viscosity of the amorphous polymer was 0.774 dl/g and throughput of product from reactor was more than 99% (yield). For other details refer Table 1.

Example 4: Preparation of Glycol Modified Co-Polyester Having Dark Dye Peak Using Butanediol To a 220 liter volume reactor equipped with a mechanical stirrer, a packed refluxing column, a nitrogen inlet and a heat source were added 50.4 kg of 1,4-butanediol, 42.2 kg of terephthalic acid, 18.58 g of cobalt acetate (55 ppm as cobalt), 48 g of Pentaerythritol (600 wt. ppm), 64 g of PMDA and 400 g of Irganox 1076 (0.5 wt. %). Esterification was carried out at temperature of 210-220° C. under pressure up to 3.00 bars for 2-3 hours. After completion of 90% esterification, temperature was increased to 220-225° C. and TnBT (100 ppm) was added. The pre-polymer was transferred into polycondensation reactor. PEG 1500 (30%) filtered solution was added and the reaction mixture was hold for 10 minutes for mixing. Polycondensation reaction was carried out at temperature of 250-260° C. under pressure of less than 0.2 torr. After sufficient melt viscosity was achieved, polymerization was stopped. The molten polymer was cooled in the cold water and then chopped to form pellets. The intrinsic viscosity of the amorphous polymer was 0.980 dl/g and throughput of product from reactor was more than 99% (yield).

Example 5: Preparation of Sulfonated Co-Polyester by Blending Example 2 and Example 5a Example 2 and 5a both were compounded in ratios 60 and 40 in an extruder with 2.0 Kg/hour rate. The molten polymer was cooled in cold water and then chopped to form pellets. The I.V. of the amorphous polymer was 0.680 dl/g. Other details are provided in Table 1.

Example 5a: Preparation of Sulfonated Co-Polyester (Having 9.0 wt % of Sulfonated Monomer)

To a 50 liter volume reactor equipped with a mechanical stirrer, a packed refluxing column, a nitrogen inlet and a heat source were added 5.3 kg of ethylene glycol, 12.1 kg of terephthalic acid, 3.23 g of antimony trioxide (180 ppm as antimony), 2.85 g of cobalt acetate (45 ppm as cobalt), and 3.75 g of sodium acetate (250 ppm as sodium acetate). Esterification was carried out at temperature of 240-260° C. under pressure of up to 3.0 bars for 2-3 hours. After completion of 90% esterification, the reactor was depressurized and phosphoric acid was added. The pre-polymer was transferred into polycondensation reactor. Sulfonated hydroxyl terminated ester (as prepared in example 1a), was added. The reaction mixture was hold for 10 minutes for mixing. Polycondensation reaction was carried out at temperature of 280-290° C. under pressure of less than 0.2 torr. After sufficient melt viscosity was achieved, polymerization was stopped. The molten polymer was cooled in the cold water and then chopped to form pellets. The intrinsic viscosity of the amorphous polymer was 0.448 dl/g and throughput of product from reactor was more than 97% (yield).

The masterbatch prepared in the examples provided above can be blended up to the range of 30% with polyesters (viz. PET, PTT, PBT, PEN) and other co-polyesters, without influencing the mechanical properties of the polyester.

When the masterbatch produced according to Examples 1-5 are used with any of the polyesters, PEG present in the masterbatch helps in modifying the crystalline structure of the polyester. As PEG has high molecular weight, the part of the diol in polymer gets replaced by PEG molecule. This helps in increasing mobility in the crystalline structure of polymer leading in reduction of Tg and crystallinity. This reduction in crystallinity helps the masterbatch to impart easy, deep and dark dyeability to polymer, as penetration of dye molecules become easier in the polymer matrix. Thus, incorporation of the masterbatch prepared in present invention into the polyester makes the polyester chain mobile and less compact allowing easy moisture absorption and penetration of dye molecules.

TABLE 1

Details and data for Examples 1 to 5

| | | Examples | | | | |
|---|---|---|---|---|---|---|
| | | 1 | 2 | 3 | 4 | 5 Example 2 + Example 5a (60% + 40%) |
| Target Batch wt. | Kg | 80 | 15 | 15 | 80 | 10 |
| PTA | Kg | 58.4 | 11.0 | 9.7 | 42.2 | nil |
| MEG | Kg | 25.3 | 4.8 | nil | nil | nil |
| PDO | Kg | nil | nil | 5.1 | nil | nil |
| BDO | Kg | nil | nil | nil | 50.4 | nil |
| $Sb_2O_3$ | ppm | 240 | 260 | nil | nil | nil |
| $CoAc_2$ | ppm | nil | 60 | 20 | 55 | nil |
| $GeO_2$ | ppm | nil | nil | nil | nil | nil |
| $H_3PO_4$ | ppm | nil | 60 | nil | nil | nil |
| TEPA | ppm | 200 | nil | nil | nil | nil |
| Irganox 1076 | % | nil | nil | 0.03% | 0.50% | nil |
| Irganox 1010 | % | nil | 0.50% | nil | nil | nil |
| Irgafos 168 | % | nil | nil | nil | nil | nil |
| Pentaerythritol | ppm | 500 | 400 | 300 | 600 | nil |
| PMDA | ppm | nil | 800 | nil | 800 | nil |
| Sodium Acetate | ppm | 250 | nil | nil | nil | nil |
| NaDMSIP | % | 3.5% | nil | nil | nil | nil |
| PEG 1500 | % | 20% | 30% | 20% | 30% | nil |
| TnBT | ppm | nil | nil | 50 | 100 | nil |
| Parameters | | 1 | 2 | 3 | 4 | 5 |
| I.V. | Dl/g | 0.734 | 0.801 | 0.774 | 0.980 | 0.68 |
| —COOH | meq/Kg | 17 | 17 | 58 | 21 | 21 |
| Chips/gm | Nos | 42 | 63 | 61 | 56 | 54 |
| Color L* | CIELab | 60 | 51.3 | 54.9 | 68.9 | 52.1 |
| Color a* | | −1.1 | −2.0 | 3.3 | 28 | −1.2 |
| Color b* | | 10.8 | 6.3 | 19.9 | 15.4 | 6.6 |
| DEG | wt. % | 3.7 | 2.2 | nil | nil | 2.7 |
| Tch1 | ° C. | 115.8/126.6/135.1 | 79.7/84.5/90.1 | not detected | not detected | 116.5/125.5/131.9 |
| Tm1 | ° C. | 218.7/237.6/244.8 | 231.0/244.5/251.5 | 216.4/221.3/225.2 | 208.7/212.0/219.5 | 225.7/241.0/247.5 |
| Delta H1 | J/g | 26.3 | 18.3 | 46.5 | 19.8 | 24.1 |
| Tm2 | ° C. | 218.6/235.9/244.8 | 220.4/235.3/244.1 | 204.8/218.0/221.5 | 201.9/209.7/218.1 | 217.1/237.0/248.9 |
| Delta H2 | J/g | 30.1 | 25.5 | 43.2 | 21.9 | 29.4 |
| MFI @280° C. | g/10 min | 56.2 | 140 | 185 | 144.8 | 62 |

TABLE 2

Variations in properties of Normal PET in comparison to the blends of masterbatches produced in Examples 1 and 2 with Normal PET

| Grades and their data | 100% Normal PET (Textile grade) | 10% of masterbatch as prepared in Example 1 + 90% Normal PET | 10% Example 2 as prepared in Example 2 + 90% Normal PET |
|---|---|---|---|
| % crystallinity of yarn | 42.4 | 36.9 | 40.0 |
| $T_g$ (° C.) | 79.8 | 74.4 | 71.8 |
| $T_{ch}$ (° C.) | 127.3 | 141.6 | 115.5 |
| $T_{cc}$ (° C.) | 217.4 | 201.9 | 213.9 |

Above provided Table 2 shows that blending the masterbatch helps reducing glass transition temperature as well as crystallinity hence, the penetration of dye molecules becomes easier and dark and deep dyeing can be achieved at lower temperature and atmospheric pressure.

TABLE 3

Comparison of properties at different temperature conditions for 100% PET and Blends (5% and 10%) with Masterbatch as produced in Example 2
Comparison for 100% PET and Blends (5% and 10%) with Masterbatch as produced in Example 2

| Normal PET | wt. % | 100% PET | 100% PET | 100% PET | 95% PET + 5% Example 2 | 95% PET + 5% Example 2 | 90% PET + 10% Example 2 | 90% PET + 10% Example 2 |
|---|---|---|---|---|---|---|---|---|
| Temperature | ° C. | 130 | 70 | 80 | 70 | 80 | 70 | 80 |
| Time | Min | 90 | 90 | 90 | 90 | 90 | 90 | 90 |
| L* | As | 41.4 | 74.2 | 63.1 | 50.7 | 48.6 | 48.6 | 48.2 |
| a* | such | 5.7 | −6 | −3.4 | 1.4 | 2.3 | 2.3 | 2.6 |
| b* | | −22.3 | −18.5 | −27 | −30.8 | −30.3 | −29.6 | −28.2 |
| Dye Bath Exhaustion | | 67% | 63% | 66% | 88% | 88% | 90% | 90% |

Advantages of the Invention

The masterbatch prepared in the present invention has several advantages a) Masterbatch can be melt blended up to the range of 30% to any of the polyesters for achieving easy, dark and deep dyeing
b) Dyeing can be done at temperature less than 100° C., preferably at 65° C. to 98° C. under atmospheric pressure
c) Masterbatch blended polymer has soft feel in its texture, appearance and performance is closer to natural polymers
d) Almost complete exhaustion of dye bath takes place, the spent dyebath has reduced dye content and thus making the use of masterbatch for dyeing an environment friendly and cost effective process
e) Lesser time is required for dyeing
f) Dyed stuff such as yarn/fibers/fabric is non bleeding
g) Differential dyeing can be achieved, which is helpful in getting various designs and prints for several polyesters/co-polyesters in fibers/fabrics
h) Masterbatch can be used in reactive and disperse dyes simultaneously in the same dye bath
i) Improves mechanical properties of fiber/filament yarn enabling ease in upstream processing
j) Enables increased spinning speed improving productivity and improves spinning process
k) Enables effective inventory control and management.

The invention claimed is:

1. A process for producing a polyester masterbatch comprising a blend of sulfonated co-polyester and glycol modified co-polyester comprising the following production and blending steps:

A glycol modified co-polyester production step comprising:
   a) reacting at least one dicarboxylic acid or ester thereof with at least one diol at about 200-270° C. in an (trans)esterification reaction to forma a first polyester in the presence of at least one anti-oxidant greater than 0 wt % and up to 1.0 wt % and one or more additives greater than 0 wt % and up to 20 wt %;
   b) subsequently adding in a polycondensation reaction with the first polyester of step a) a polyethylene glycol-1500 in an amount of 20 wt % to 60 wt % to form the glycol modified co-polyester;

A sulfonated co-polyester production step comprising:
   c) reacting at least one dicarboxylic acid or ester thereof with at least one diol at about 200-270° C. in an (trans)esterification reaction to form a first polyester in the presence of at least one anti-oxidant greater than 0 wt % and up to 1.0 wt % and greater than 0 wt % and one or more additives up to 20 wt %;
   d) adding to the product formed in c) a bis (2-hydroxyethyl) dimethyl sulfoisophthalate (DMSIP) or a bis (2-hydroxyethyl) isophthalic sulfonate (SIPA) in an amount of greater than 0 wt % and up to 40 wt % to form a sulfonated co-polyester;

Wherein the sulfonated co-polyester and the glycol modified co-polyester are prepared separately then blended with each other to provide the sulfonated co-polyester and glycol modified co-polyester blended polyester masterbatch.

2. The process of claim 1, wherein said dicarboxylic acid is selected from the group consisting of terephthalic acid, isophthalic acid, 2,6-napthalene dicarboxylic acid, 3,4'-diphenyl ether dicarboxylic acid, hexahydrophthalic acid, 2,7-naphthalenedicarboxylic acid, phthalic acid, 4,4'-methylenebis(benzoic acid), oxalic acid, malonic acid, succinic acid, methylsuccinic acid, glutaric acid, adipic acid, 3-methyladipic acid, pimelic acid, suberic acid, azelaic acid, sebacic acid, 1,11-undecanedicarboxylic acid, 1,10-decanedicarboxylic acid, undecanedioic acid, 1,12-dodecanedicarboxylic acid, hexadecanedioic acid, docosanedioic acid, tetracosanedioic acid, dimer acid, 1,4-cyclohexanedicarboxylic acid, 1,3-cyclohexanedicarboxylic acid, 1,1-cyclohexanediacetic acid, fumaric acid, maleic acid, and hexahydrophthalic acid.

3. The process of claim 2, wherein the acid is terephthalic acid.

4. The process of claim 1, wherein said ester of dicarboxylic acid is selected from the group consisting of dimethyl terephthalate, dimethyl isophthalate, dimethyl-2,6-naphthalate, dimethyl-3,4'-diphenyl ether dicarboxylate, dimethyl hexahydrophthalate, dimethyl-2,7-naphthalate, dimethyl phthalate dimethyl-4,4'-methylenebis(benzoate), dimethyl oxalate, dimethyl malonate, dimethyl succinate, dimethyl glutarate, dimethyl adipate, dimethyl azelate, dimethyl-1,3-cyclohexanedicarboxylate, and 5-sulfo-dimethyl-isophthalate.

5. The process of claim 4, wherein the ester is dimethyl terephthalate.

6. The process of claim 1, wherein said diol is selected from the group consisting of mono ethylene glycol (MEG), diethylene glycol, 1,3-propanediol, 1,4-butanediol, 1,6-hexanediol, 1,8-octanediol, 1,10-decanediol, 1,12-dodecanediol, 1,14-tetradecanediol, 1,16-hexadecanediol, dimer diol, (cis, trans) 1,4-cyclohexanedimethanol, di(ethylene glycol), tri(ethylene glycol), poly(ethylene ether) glycols, poly(butylene ether) glycols, branched diols, hexane diol, or combinations or derivatives thereof.

7. The process of claim 6, wherein the diol is selected from mono ethylene glycol, diethylene glycol, 1,3-propanediol, or 1,4-butanediol.

8. The process of claim 1, wherein amount of polyethylene glycol-1500 is from 20 weight percent up to 30 weight percent.

9. The process of claim 1, wherein said anti-oxidant is selected from the group consisting of PentaerythritolTetrakis (3-(3,5-di-tert-butyl-4-hydroxyphenyl)propionate), Octadecyl-3-(3,5-di-tert.butyl-4-hydroxyphenyl)-propionate, Bis-(2,4-di-t-butylphenol) PentaerythritolDiphosphite, and Tris(2,4-ditert-butylphenyl)phosphite.

10. The process of claim 1, wherein said additives are selected from the group consisting of catalysts, pigments, flame retardant additives, reinforcing agents, ultraviolet light stabilizers, impact modifiers, flow enhancing additives, ionomers, liquid crystal polymers, fluoropolymers, olefins, polyamides, ethylene vinyl acetate copolymers, stabilizing agents, delustering agents, carriers, levelling agents, and porosity additives.

11. The process according to claim 10 wherein the catalyst is selected from salts or adducts of acetates, oxides, glycol adducts and alkoxides of metals selected from lithium, calcium, magnesium, manganese, zinc, lead, antimony, tin, germanium and titanium.

12. The process according to claim 10, wherein the additive is selected from zinc acetate, antimony trioxide, barium sulphate, sodium acetate, triphenyl phosphine, aluminum sulphate, cobalt acetate and titanium dioxide.

13. A polyester composition comprising the polyester masterbatch produced according to claim 1 blended with greater than 0 wt % and up to 30 wt % polyesters, recycled polyethylene terephthalate (RPET), or both polyester and RPET for the production of polyester filament yarn (PFY) or polyester staple fiber (PSF) or bulk continuous fiber (BCF) with respect to the total polyester composition.

14. A process for differential dyeing of polyester-containing fibers or fabrics comprising blending the polyester masterbatch produced according to claim 1 with polyester to form a polyester composition.

15. A polyester composition according to claim 13, wherein the glass transition temperature (Tg) and crystallinity of the polyester composition is reduced after blending.

* * * * *